Dec. 6, 1949     G. F. N. OLIVER     2,490,598
TUBULAR SECONDARY ELECTRIC BATTERY
Filed Aug. 30, 1944
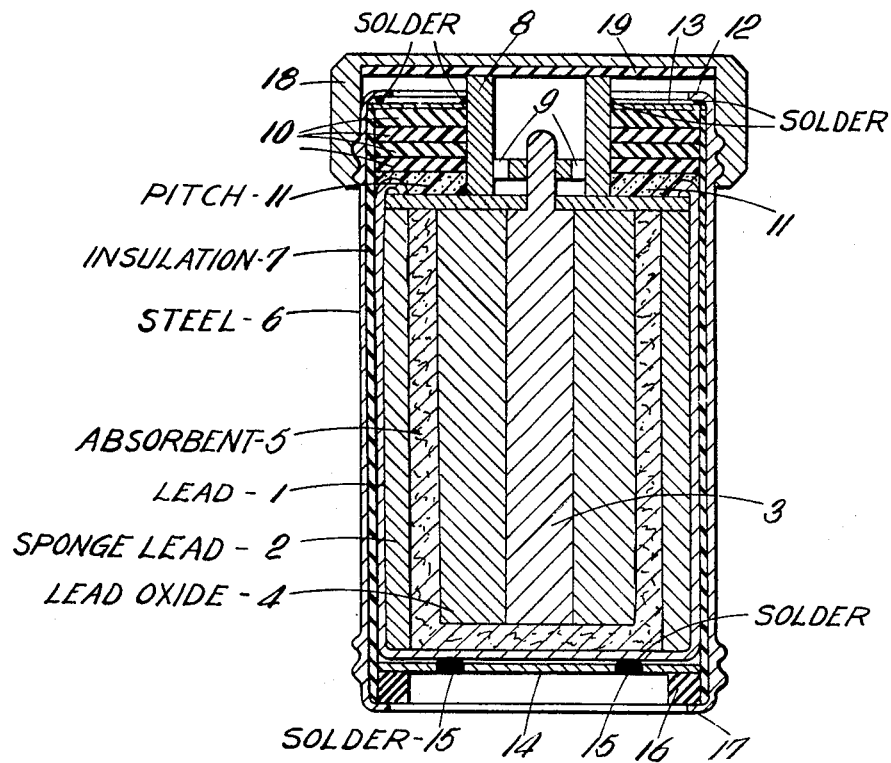
Inventor
G. F. N. Oliver
by Wilkinson & Mawhinney
Attorneys Patented Dec. 6, 1949

2,490,598

UNITED STATES PATENT OFFICE 2,490,598

TUBULAR SECONDARY ELECTRIC BATTERY

George Francis Norris Oliver, London, England, assignor, by mesne assignments, to Leonard Fuller, London, England, and Edmund William Sudlow, Leigh-on-Sea, England Application August 30, 1944, Serial No. 551,860
In Great Britain September 24, 1943

9 Claims. (Cl. 136—7)

This invention relates to secondary electric batteries and is particularly applicable to so-called dry accumulators in which the acid is absorbed by a porous packing.

Such dry accumulators of, for example, the lead acid type must be charged with fresh liquid from time to time and accordingly a charging opening must be provided. In the past difficulties have been encountered in adequately sealing this opening in a battery intended for use in a portable device such as a hand torch or a radio.

An important object of the present invention is to provide a battery with an improved seal for the charging opening.

Another object of the invention is to provide a battery with a robust casing which will withstand continued handling.

A further object of the invention is to provide a battery in which the normal contact can be made to serve also during charging.

Yet another object of the invention is to construct a battery cheaply with a sheet metal casing and yet to eliminate any risk of short circuits caused by careless handling.

The manner in which these objects are achieved will be most clearly understood by the following description of the preferred embodiment of my invention when taken in conjunction with the annexed drawing, in which the figure is a central longitudinal section through the battery.

The whole battery shown in the drawing is cylindrical and comprises a single secondary electric cell of the dry accumulator type. This includes a substantially cup-shaped outer electrode 1 composed of thin lead having its internal surface coated with a thick layer of negative active material 2. There is a central positive electrode 3 surrounded by a cylindrical mass of positive active material 4 and the two active materials 2 and 4 are separated by a porous insulating layer 5. This type of cell is well known and as a rule it is enclosed within an insulating casing. In my invention I provide a tubular metal casing 6 which both serves to protect the cell and itself forms one of the electric terminals. This metal casing 6 is separated from the electrode 1 by an insulating sleeve 7.

At the head of the battery there is a cylindrical metal wall 8, the interior of which constitutes when uncovered the charging opening for liquid and the vent for escaping gases. This wall is electrically connected to the positive electrode 3 by radial webs 9 and it is surrounded by rubber rings 10 which are stuck together and assembled under pressure. Below the lowermost rubber ring and at the base of the cylindrical wall 8 the material of the cell is sealed by pitch 11 in the usual way. On top of the uppermost rubber ring 10 there is an annular metal disc 13 which is soldered at its inner edge to the wall 8 and at its outer edge to an inturned flange 12 which is integral with the metal casing 6. The insulating sleeve 7 extends up to the lower face of the metal disc 13. Thus the metal casing 6 is in electrical contact with the positive electrode 3 and constitutes one of the electric terminals of the whole battery.

The preferred materials for the various parts are as follows:

2=negative-active material (spongy lead)
3=antimonial lead
4=lead oxide
5=kieselguhr
6=steel
14=brass
18=moldable synthetic resin material, or metal A metal disc 14 is soldered at 15 to the base of the cup-shaped electrode 1. Both the sleeve 7 and the casing 6 extend axially beyond the disc 14 and an insulating ring 16 is held in position between the disc 14 and an inturned flange 17 integral with the lower end of the metal casing 6. This disc 14 accordingly forms the negative terminal of the whole battery.

The casing 6 is externally screw-threaded at each end so that at the lower end it may be screwed into an internally screw-threaded torch head or similar device and at the upper end may receive an internally screw-threaded cap 18 containing a rubber disc 19. When this cap is screwed on to the top end of the casing 6 the rubber disc 19 bears firmly on the mouth of the charging opening formed by the wall 8 and positively seals that opening.

By means of the construction described a number of advantages are obtained. The charging opening is easily positively sealed and the upper end of the battery is completely enclosed by the metal casing 6 up to the central charging opening.

The negative contact plate 14 lies wholly within the end flange 17 of the casing so that the risk of short circuits caused by careless handling is largely eliminated and the battery can be placed on a flat metal plate in any position without risk. The negative contact plate should be rendered non-corrodible for contact purposes.

The end flange 17 need extend radially inwards for only a short distance and thus can easily be formed by spinning over the metal during the production of the casing from tubular material.

As the battery is completely enclosed within a metal casing it is robust enough to withstand continued handling. The casing itself may form part of the body of the torch or other apparatus with which the battery is associated. Another advantage that is obtained by means of the invention is that the parts at which the electric contacts are made are at the end of the battery remote from the charging opening. This opening serves as a gas vent when it is uncovered, and the gases do not come into contact with and corrode the electrical contacts.

A further advantage is that the electrical contacts to which the associated apparatus is connected are not made of lead but of metal which can readily be treated against corrosion. Moreover these contacts can be made to serve also during charging, since a battery made as described can easily be screwed into a threaded holder or union for charging purposes.

Finally the casing can be made from sheet metal very cheaply, and yet the whole battery can be used in hand torches and so on which are subject to heavy usage. It will readily be understood that the service life of such a secondary battery under heavy loads is much greater than that of primary dry batteries of similar size commonly used in hand torches, and that the battery can be recharged at low cost when necessary.

What I claim is:

1. An electric battery comprising a central positive electrode and an outer metallic shell partially constituting the negative electrode, a cylindrical insulating sleeve surrounding said shell, a cylindrical metal casing surrounding said sleeve, a tubular metal wall electrically and mechanically connected with both said central electrode and the casing, said wall being of smaller diameter than and located at one end of and coaxially with the battery, means for sealing the annular space between said wall and said sleeve, said wall defining an opening for charging liquid into said cell, a cylindrical cap adapted to close the end of the casing at which said wall is situated, sealing means within said cap for positively sealing said charging opening when said cap is in position, a circular metal disc in contact with the shell at the other end of said battery and forming the negative electric terminal of the battery, and means insulating said disc from the casing.

2. An electric battery comprising a central positive electrode and an outer metallic shell partially constituting the negative electrode, a cylindrical insulating sleeve surrounding said shell, a cylindrical metal casing surrounding said sleeve, a tubular metal wall electrically and mechanically connected with both said central electrode and the casing, said wall being of smaller diameter than and located at one end of and coaxially with the battery, means for sealing the annular space between said wall and said sleeves, said wall defining an opening for charging liquid into said cell, an internally screw-threaded cylindrical cap adapted to screw over said end of said casing, the latter being correspondingly screw-threaded, sealing means within said cap for positively sealing said charging opening when the cap is screwed home, a circular metal disc in contact with the shell at the other end of the battery and forming the negative electric terminal of the battery, and means insulating said disc from the casing.

3. An electric battery comprising a central positive electrode and an outer metallic shell partially constituting the negative electrode, a cylindrical metal casing surrounding the battery being insulated from said shell and having an opening at one end thereof for charging liquid into the battery assembly, supporting means at the same end of the battery for supporting said central positive electrode and electrically connecting it with said casing, a metal plate in contact with the other end of the shell and forming the negative terminal of the battery, and insulating means insulating said plate from said casing.

4. In a secondary electric battery, a cylindrical metal casing, a cylindrical metal shell constituting part at least of the negative electrode and housed within said casing, an insulating closure member part at least of which is porous at one end of said battery assembly, and a central positive electrode within said shell and having one end thereof projecting through said closure member, supporting means for supporting the projecting end of the positive electrode and electrically connecting it with the casing, said supporting means forming a vent surrounding the projecting end, insulating means separating said shell from said casing, a negative terminal plate at the end of the battery assembly opposite to that of said vent means, said terminal plate being electrically connected with said shell, and insulating means insulating said negative terminal plate from said casing.

5. A secondary electric battery comprising a central positive electrode and an outer metallic shell partially constituting the negative electrode and surrounding the positive electrode, a tubular metal casing enclosing said shell and serving to constitute the positive terminal and to protect the battery, insulating means for insulating the casing from said negative electrode, supporting means at one end of the battery for supporting the positive electrode and electrically connecting the same with the casing, a vent tube at the same end of the battery as said supporting means, and a negative terminal plate at the other end of said battery electrically connected to the battery and insulated from said casing.

6. A secondary electric battery as claimed in claim 5 characterized by the fact that a cap is carried by the casing for sealing said vent tube.

7. A battery as claimed in claim 6, in which the casing is cylindrical and is screw-threaded at both ends for connection respectively with said cap, which is also screw-threaded, and with a lamp-holder, charging socket or other appliance.

8. A battery as claimed in claim 5, in which the casing extends beyond the negative terminal plate at the end of the battery at which the latter is situated so that the terminal plate is located in a recess.

9. In a secondary electric battery, a tubular metal casing, a cell comprising a metal shell constituting part at least of the negative electrode and housed within and insulated from said casing, an insulating closure member, part of which at least is porous, at one end of said cell, and a central positive electrode within said shell and having one end thereof projecting through said closure member, supporting means for supporting the projecting end of the positive electrode and electrically connecting it with said casing, and a negative terminal plate insulated from said casing and electrically connected to said shell, said negative terminal plate being at the opposite end of the battery from said insulating closure member.

GEORGE FRANCIS NORRIS OLIVER.

REFERENCES CITED

The following references are of record in the file of this patent:

UNITED STATES PATENTS

| Number | Name | Date |
|---|---|---|
| 902,173 | Schauli | Oct. 27, 1908 |
| 925,412 | Addie | June 15, 1909 |
| 1,654,823 | Millar | Jan. 3, 1928 |
| 2,081,926 | Gyuris | June 1, 1937 |
| 2,232,415 | Talbot et al. | Feb. 18, 1941 |
| 2,325,070 | Muldoon | July 27, 1943 |

FOREIGN PATENTS

| Number | Country | Date |
|---|---|---|
| 254,707 | Italy | Aug. 25, 1927 |

OTHER REFERENCES

A. I. E. E., Am. Std. Definitions of Electrical Terms (1942), p. 184.